United States Patent Office 3,337,409
Patented Aug. 22, 1967

3,337,409
PROCESS FOR THE RECOVERY OF HEPARIN
Robert E. Williams, Sherman Oaks, Calif., assignor to Rexall Drug and Chemical Company, Los Angeles, Calif., a corporation of Delaware
No Drawing. Filed Nov. 20, 1963, Ser. No. 325,146
11 Claims. (Cl. 167—74)

This application is a continuation-in-part of my copending application entitled "Process for the Recovery of Heparin," Ser. No. 243,663, filed Dec. 10, 1962, now abandoned.

This invention relates to an improved process for the recovery and purification of heparin. More particularly it relates to a new and novel process for the separation of a purified heparin at high yields from materials containing crude heparin, such as animal tissues.

Heparin is a well known naturally occurring substance which is widely used by the medical profession in anticoagulant therapy. Heparin is present in a variety of animal tissues and may be obtained by extraction therefrom, for example from beef small intestine, beef lung, hog duodenum, hog liver, hog intestinal mucosa and the like. Since heparin is present in such tissues at but a low concentration, a multistep process of extraction and purification is required to separate it therefrom and yield a heparin product having a degree of purity satisfactory for safe use in human therapy.

All commonly used heparin recovery processes have as an initial step the contacting of the animal tissues with a hot aqueous salt solution which serves to release heparin from the cells of the tissues. The heparin content of the resulting medium is extremely low and recovery techniques heretofore known have not proved sufficiently efficient to insure high percentage recoveries of the heparin therefrom.

The various prior art processes all involve a step of filtration of the animal tissue-aqueous medium slurry to prepare a heparin containing extract. This step is time consuming in view of the slimy nature of the tissues and results in reduced yields of heparin since there is a substantial amount of residual heparin in the tissue residue. In addition, the prior art processes which depend upon the formation of a complex of heparin with a complexing agent suffer from lowered yields in view of the difficulty of obtaining a clear-cut physical separation of the complex from the extract. There has, therefore, long been a need for an efficient process of separating heparin from animal tissues.

In addition, during the course of any heparin recovery and purification process, heparin fractions of varying degrees of purity may be obtained from which it is desirable to recover more highly purified heparin fractions. An efficient process for effecting such purification has obvious value.

It is an object of this invention to provide an efficient process for the purification of heparin.

It is a further object of this invention to provide a method of recovering a purified heparin from animal tissues containing it which is characterized by a high percentage recovery of heparin.

Other objects and the advantages of the invention will become apparent from the following detailed description.

It has now been found that the aforementioned objects are fulfilled by treating a material containing heparin with a quaternary ammonium anion exchange resin as hereinafter described in an aqueous medium in the presence of an alkali metal, alkaline earth metal or ammonium salt of an acid, separating the resin containing bound heparin from the medium and recovering purified heparin from the separated resin.

The present invention in its broadest aspect resides in the treatment of any material containing heparin by the process described hereinabove. Such heparin may be that present in animal tissues, or in an aqueous salt extract of such tissues, or as obtained at any step in an integrated heparin recovery process. The process of this invention is thus adapted to the recovery of heparin from animal tissues or for upgrading any heparin fraction.

The quaternary ammonium anion exchange resins which are useful in carrying out the method of the present invention are copolymers of a mixture of an aromatic monovinyl hydrocarbon and an aromatic divinyl hydrocarbon, the mixture containing 96 to 99.9 mole percent of the monovinyl hydrocarbon and 4 to 0.1 mole percent of the divinyl hydrocarbon, the copolymer containing on the aromatic nuclei substituent groups of the formula

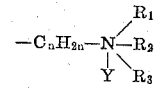

wherein $n$ is 1 to 4, $R_1$, $R_2$ and $R_3$ are hydrocarbon groups and Y is an anion, there being at least 1 of such substituent groups for each 15 aromatic nuclei in the molecule. Quaternary ammonium anion exchange resins of the type described above are fully described in U.S. Patent 2,591,573 and are prepared by the techniques described therein.

The quaternary ammonium anion exchange resins used in the method of the invention are quaternary ammonium derivatives of copolymers of such aromatic monovinyl hydrocarbons as styrene, o-, m- and p-methylstyrenes, o-, m- and p-ethylstyrenes and the like with such aromatic divinyl hydrocarbons as divinyl benzene, divinyl toluenes, divinyl xylenes, divinyl ethylbenzenes and the like. Copolymers of styrene and divinyl benzene are preferred. While resins have heretofore been made based on copolymers of mixtures of as little as 60 mole percent monovinyl hydrocarbon and as much as 40 mole percent divinyl hydrocarbon, the resins useful in the process of this invention should be derivatives of copolymers of mixtures 96 to 99.9 mole percent monovinyl hydrocarbon and 4 to 0.1 mole percent divinyl hydrocarbon. Where the method of the invention is applied to an aqueous salt solution-animal tissue homogenate as described hereinafter, it is preferred that the copolymer be of a mixture of at least 98 mole percent aromatic monovinyl hydrocarbon and not more than 2 mole percent aromatic divinyl hydrocarbon.

The quaternary ammonium anion exchange resins for use in the invention bear substituent groups on the aromatic nuclei of the copolymer having the formula:

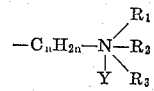

In the above formula, $n$ is an integer of 1 to 4, —$C_nH_{2n}$— thereby being a straight or branched chain alkylene group containing 1 to 4 carbon atoms. $R_1$, $R_2$ and $R_3$, which may be the same or different, are hydrocarbon groups including lower alkyl, such as methyl, ethyl, propyl and the like, hydroxy-lower alkyl, such as hydroxymethyl, hydroxyethyl, hydroxypropyl and the like, cycloalkyl, such as cyclopentyl or cyclohexyl, phenyl, benzyl, phenethyl and the like. Y is an exchangeable anion other than heparin, for example, hydroxyl, chloride, sulfate, nitrate, bicarbonate, acetate and the like.

The amount of heparin which may be recovered per pound of resin is proportional to the number of quaternary ammonium substituent groups per aromatic nucleus in the molecule. It is desirable that there be at least 1 such group for every 15 aromatic nuclei. Quaternary ammonium anion exchange resins of the type described hereinabove are available having a range of substitution of quaternary ammonium substituent groups per molecule. Those resins having higher degrees of such substitution are preferred since a smaller quantity of resin is required to recover a given amount of heparin.

It has been found that styrene-divinyl benzene copolymers containing methylene trimethyl ammonium chloride groups ($n=1$, $R_1$, $R_2$, $R_3=$—$CH_3$, $Y=$—Cl) and methylene dimethyl hydroxyethyl ammonium chloride groups ($n=1$, $R_1$, $R_2=CH_3$, $R_3=$—$CH_2$—$CH_2$—OH, $Y=$—Cl) are preferred. Such resins are commercially available under the trademarks Dowex-1 and Dowex-2. Such resins having structures formed by copolymerization of mixtures of 98 to 99 mole percent styrene and 2 to 1 mole percent divinylbenzene are particularly effective.

In accordance with the invention, a heparin-containing material is first placed in intimate contact with an aqueous medium, to form a solution or a finely divided uniform suspension. The pH of the medium should be within the range of about 4 to about 10 with a pH range of 7 to 9 being particularly effective. It has been found that the aqueous medium must contain a water soluble alkali metal, alkaline earth metal or ammonium salt of an acid, or mixtures of such salts, useful salts including the water soluble sodium, potassium, ammonium, calcium, barium and strontium salts of mineral acids such as hydrochloric, nitric, sulfuric, phosphoric, carbonic and the like and of lower alkyl carboxylic acids such as acetic, propionic and the like. Alkali metal or ammonium nitrates and chlorides have been found to be particularly effective. pH adjustment is most conveniently effected by use of an acid or base having the same anion or cation, respectively, as a salt present in the aqueous medium. Alternately, other acidic or basic substances can be used.

The aqueous medium must contain an effective amount of a salt of the class described hereinabove or mixtures of such salts, that is, a quantity of dissolved salts within the range over which the equilibrium between heparin bound to the resin and heparin remaining in solution insures that at least 50% of the heparin activity is bound to the resin. It has been found that when a resin of the class described above is stirred with an aqueous solution of heparin containing no dissolved salt, there is substantially no uptake of heparin by the resin. In aqueous media containing progressively increasing concentrations of dissolved salt, the percentage of heparin uptake by the resin progressively increases as a function of increasing salt molarity until a condition of maximum percentage uptake is reached. Thereafter, further increases in salt concentration result in progressively decreasing percentages of heparin uptake by the resin. The range of salt concentrations over which at least 50% of the heparin present in the aqueous medium is taken up by and becomes bound to the resin varies with the particular salt system present but may readily be determined by the following simple test procedure.

In carrying out the test, a standard heparin solution of known concentration in an aqueous medium containing dissolved salt is stirred with an excess of the quaternary ammonium anion exchange resin to be used in the recovery process at the pH conditions to be used in the process for a period of two hours. The resin is removed and the heparin potency in the supernatant liquid is determined. If the supernatant liquid contains less than 50% of the heparin activity originally present in the standard solution, an effective amount of dissolved salt is present in the aqueous dissolved medium used in the test.

It is apparent, of course, that for economic reasons, the salt concentration should be selected within a range to insure as near to quantitative uptake of heparin by the resin as possible. With the particularly effective alkali metal and ammonium nitrates and chlorides, it has been found that at least 0.1 mole of dissolved salt per liter of solution should be present. When an alkali metal or ammonium nitrate is used, it is preferred that the salt concentration not exceed about one mole per liter, and with alkali metal or ammonium chlorides the dissolved salt concentration should not exceed about 1.25 moles per liter to insure the optimum degree of heparin uptake by the resin.

In carrying out the process of the present invention the quaternary ammonium anion exchange resin is added to the aqueous salt medium containing crude heparin-containing material in solution or suspension. The mixture is stirred so as to maintain a relatively even dispersion of the resin particles. At intervals the stirring is discontinued and the resin particlese are allowed to settle. A sample of the supernatant liquid is taken and assayed for heparin activity by the method described in the U.S. Pharmacopeia. This procedure of alternate stirring and sampling is continued until two consecutive samples of the supernatant liquid upon assay shows substantially equal levels of heparin activity, thus indicating that equilibrium has been attained.

The quantity of resin used depends upon the amount of heparin present in the aqeous medium as well as on the number of quaternary ammonium substituent groups on each aromatic nucleus of the resin copolymer molecule. If periodic samples of the supernatant liquid as described above indicate the presence of a substantial concentration of heparin in the aqueous medium additional resin is added to insure that an excess of resin is present.

The step of contacting the aqueous medium containing crude heparin with the quaternary ammonium ion exchange resin can also be carried out by passing the aqueous medium downwardly over a bed of resin in a column. The technique of alternate stirring and settling is generally preferred since it enables one to follow closely the course of the adsorption to insure substantially complete recovery.

At the conclusion of the adsorption step described above, the resin containing bound heparin is washed free of supernatant aqueous medium and then is processed for recovery of purified heparin therefrom by elution. The resin is contacted with an aqueous solution of an alkali metal or ammonium salt of a mineral acid, with alkali metal or ammonium nitrates and chlorides being preferred, for example sodium chloride, potassium chloride, ammonium nitrate, ammonium chloride, sodium intrate and potassium nitrate. To facilitate reuse of the resin in subsequent heparin recovery runs, the anion present in the eluting solution should be the same as the anion originally present in the quaternary ammonium anion exchange resin. For example, where the anion of the resin (Y) is chloride, alkali metal and ammonium chlorides are particularly desirable salts in the eluting solution, thereby insuring regeneration of the resin in the chloride form suitable for reuse in subsequent runs.

As described hereinabove, the concentration of dissolved salts in an aqueous medium containing heparin has a direct bearing upon the equilibrium which exists between heparin bound to the resin and heparin dissolved in the aqeuous solution. As salt concentrations are increased above the point at which the equilibrium favors maximum percentage of heparin bound to the resin, ever increasing proportions of the heparin bound to the resin are released to the aqueous medium. To insure optimum recovery of heparin, it is desirable that the aqueous salt solution used for elution be of a sufficiently high ionic strength to insure substantially complete release of heparin from the resin.

It has been found that the use of an aqueous solution of an alkali metal or ammonium nitrate or chloride having a concentration of at least 1.9 moles of dissolved salt per liter of solution is desirable to insure a high degree of heparin release from the resin to the eluting solution. To insure quantitative recovery in a one-step elution process, molarities substantially in excess of 1.9 molar up to saturation of the salt in the eluting solution are employed.

In accordance with a preferred embodiment of the invention, it has been found that significant further purification of heparin can be realized by carrying out at least two elutions at differing salt molarities. The first elution is carried out at a salt concentration at which essentially no heparin activity is released from the resin. By first contacting the resin containing bound heparin with an aqueous solution of an alkali metal or ammonium nitrate at a concentration of about 1 to about 1.25 molar or an alkali metal or ammonium chloride at a concentration between about 1.25 and about 1.6 molar, the material which is eluted from the resin is essentially devoid of heparin activity. It is apparent that any such removal of inactive material is desirable since it serves to render the heparin subsequently separated from the resin of a higher degree of purity.

After the initial contact of the resin containing bound heparin with a first eluting solution as described above, the resin is contacted with an aqueous solution of an alkali metal or ammonium nitrate or chloride at a concentration greater than 1.9 molar, thereby releasing heparin bound to the resin into the eluting solution. In accordance with the above-described two-step elution process, the second eluent possesses essentially all of the heparin activity present on the resin but at a higher potency than if only a single elution at a salt concentration of greater than about 1.9 molar had been carried out.

In accordance with a still further embodiment of the invention, the molarity of the salt solution used to release heparin bound to the resin is maintained within the range of about 1.9 molar to about 2.3 molar. It has been found that by eluting first at a molarity not exceeding about 2.3 molar, the material released from the resin by contact thereafter with a salt solution having a concentration of greater than about 2.3 molar is devoid of any significant amount of heparin activity. Accordingly, the heparin released from the resin is not contaminated with the inactive material which remains on the resin at this molarity.

The resin remaining after elution, in accordance with the various elution processes described above, is suitable for reuse in subsequent heparin recovery runs without further purification. For optimum results, however, it is desirable to subject the resin to a "clean-up" elution step in which the resin is contacted with an aqueous salt solution of high molarity, preferably in excess of 3 molar, which serves to remove inactive material bound to the resin, thereby to yield a clean resin ideally suited for reuse in subsequent heparin purification and recovery processes.

Inasmuch as essentially all the heparin bound upon the resin is removed over a range of salt concentrations as described hereinabove, the elution can be carried out over this range of molarities in a gradient fashion, whereby the resin is contacted with successive small fractions of progressively increasing molarities. The successive fractions can then be processed separately to recover therefrom fractions of varying heparin potency. In this manner, heparin fractions can be obtained having potencies in the order of 200 units per milligram.

After contact of the resin containing bound heparin with a salt solution or solutions as described above, the solution or solutions containing heparin are processed for recovery of the heparin therefrom by conventional procedures, for example, treatment with an organic solvent such as methanol, ethanol, acetone and the like, which results in precipitation of heparin from the solution.

The method of the invention is adaptable to the separation of a purified heparin from a wide variety of materials containing crude heparin. It is ideally suited for the recovery of heparin from aqueous animal tissue extracts. Conventional tissue extraction processes depend upon contacting heparin-containing animal tissues, such as beef lung, beef small intestine, hog duodenum, hog liver, hog intestinal mucosa and the like, with an aqueous salt solution. The resulting extract constitutes a dilute solution of heparin.

The slurry of animal tissue and aqueous alkaline salt solution can, for example, be filtered or centrifuged and the resulting filtrate or centrifugate, after pH and salt concentration adjustments, if necessary, is then suitable for treatment with the quaternary ammonium anion exchange resin as described hereinabove. Alternately, the slurry can be homogenized and the homogenate treated with resin in accordance with the invention. Inasmuch as effective extraction of heparin from tissues can be obtained in aqueous salt solutions under conditions which are particularly effective for the method of the present invention, it is apparent that with such extraction conditions, treatment with the quaternary ammonium anion exchange resin can be effected conveniently without further pH or salt concentration adjustment. The treatment of a tissue-aqueous extract homogenate with resin is particularly desirable since the step of filtration of the tissue slurry is eliminated. The resin, being in discrete particulate form, readily separates from the homogenate and is treated for recovery of heparin therefrom as described hereinabove.

The method of the invention is also adapted to the recovery of purified heparin from any heparin-containing material obtained in a heparin recovery process. Where the material is a solid, it is placed in an aqueous salt solution and the resulting solution is treated with a quaternary ammonium anion exchange resin as described above. Where the material is an aqueous solution, the solution can be readily treated with resin after pH and salt concentration adjustment, if necessary.

The method of the present invention is characterized by excellent yields of heparin. The quaternary ammonium anion exchange resin is readily recovered from the aqueous medium after the treatment step and after separation of the heparin therefrom, is suitable for reuse in subsequent runs. Thus, the method represents a marked improvement over processes of the prior art where the agent used for complexing with heparin cannot be recovered except at prohibitive cost.

The invention also includes within its scope quaternary ammonium salts of heparin in which the cationic portion is the cation of a quaternary ammonium anion exchange resin as described above and the anion is a heparin ion. Such heparin salts are obtained as described above by treatment of a heparin-containing material with the resin and are useful as intermediates in the purification of heparin in accordance with the process aspect of the invention. They may be stored after preparation awaiting future elution to prepare purified heparin.

The best mode contemplated by the inventor for carrying out his invention will now be set forth as follows:

*Example 1*

8,200 pounds of hog casing mucosa, 200 gallons of water and 350 pounds of ammonium chloride are added to a jacketed vessel fitted with a stirrer. The pH is adjusted to 9.0 by the addition of ammonia. The mixture is heated with steam while under continuous agitation until the temperature reaches 78° C., at which time coagulation of the proteinaceous material occurs.

A 350 liter aliquot of the above heat coagulated mixture having a pH of 8–8.5 and an ammonium chloride content of 0.5 molar, is homogenized twice. To 320 liters of the resulting homogenate (heparin potency=37 u./ml.) are added 6 liters of Dowex 1–X1 resin. Dowex 1–X1 resin is a copolymer of a mixture of 99 mole percent styrene and 1 mole percent divinylbenzene containing on the aromatic nuclei groups of the formula:

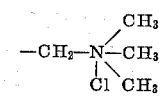

The capacity of the resin is 3.5 milliquivalents/gram (dry), indicating approximately one such group for each 1.7 aromatic nuclei.

The resulting mixture is stirred overnight. The following morning 100 liters of distilled water are added to reduce the viscosity of the suspension sufficiently to insure rapid settling of the resin containing adsorbed heparin. The potency of the supernatant homogenate after removal of the resin is 5 heparin units per ml., indicating that the resin has taken up in excess of 85% of the heparin present in the input material.

The separated resin containing bound heparin is contacted with two 12 liter portions of 20% sodium chloride solution (about 3.9 molar). The two solutions are combined and precipitated with 1.5 volumes of methanol. The resulting precipitate is collected and dried to yield 107 grams of crude heparin having a potency of 76 units per mg. This represents a recovery of 73% of the heparin activity present in the input material and is equivalent to a recovery of 15,500 heparin units per pound of hog mucosa starting material.

The results set forth in the foregoing example indicate that the method of the present invention is readily adapted to recover heparin at high yields from a tissue-extracting medium homogenate. The step of filtration of the tissue residue from the extract is eliminated, thus representing a marked simplification in processing techniques as compared to heparin recovery processes heretofore used which have invariably required a physical separation of the extract from the tissue residue before treating the extract for recovery of heparin therefrom.

Not only does the foregoing preceduce represent a marked simplification in processing techniques, but, in addition, results in a marked improvement in yields of heparin obtained from animal tissue as compared to the yields obtainable with processes of the prior art. Heretofore, yields in the order of 9,500 to 11,000 heparin units per pound of hog intestinal mucosa have been considered quite satisfactory. The method set forth in the foregoing example results in a yield of 15,500 heparin units per pound of mucosa, a yield not hitherto obtainable with any commonly used recovery technique.

*Example 2*

8,200 pounds of hog casing mucosa, 200 gallons of water, and 350 pounds of ammonium chloride are added to a jacketed vessel fitted with stirrers. The pH is raised to 9 by the addition of ammonia and then the mixture is heated with agitation until coagulation of the proteinaceous materials occurs (75–80° C.). 20 bags of filter aid are added and the resultant slurry filtered across a pre-coat rotary drum filter. The filtrate, about 5,800 liters, has a heparin potency of 20.2 u./ml. (14,250 u./lb. of mucosa).

To this filtrate are added 2.2 cu. ft. of Dowex 1–X1 resin (described in Example 1) and the mixture is agitated overnight. The agitation is then stopped and the aqueous phase assayed, showing less than 0.5 u./ml. of heparin activity. The mixture is allowed to settle for 1 hour and the resin is drawn off the bottom with but a minimum of entrapped liquor. The resin is then filtered free of entrapped liquor, washed two times with 1.20 N sodium chloride solution (washings discarded) and then eluted with 100 liters of 2 N sodium chloride solution. The entrapped eluent is then washed from the resin with an additional 50 liters of 2 N sodium chloride solution. The eluent and wash are combined and assay 730 u./ml. (13,300 u./lb. of mucosa). Heparin is precipitated by the addition of sodium chloride to 20% and 1 volume of methanol. The crude is then reprecipitated from a 1:1 1% sodium chloride-acetone system to eliminate excess salt, yielding a heparin product assaying between 130–150 u./mg. with negligible loss in heparin activity.

*Example 3*

A column is loaded with 300 ml. of Dowex 1–X2 resin, a resin identical with the Dowex 1–X1 described in Example 1 with the exception that the copolymer is formed from a mixture of 98 mole percent styrene and 2 mole percent divinylbenzene. A volume of 66 liters of filtered heparin-containing extract (prepared by technique described in Example 2) assaying approximately 29.0 units/ml. containing ammonium chloride at a concentration of 0.5 M and having a pH of 8.0–8.5 is applied to the column at the rate of 1 liter/hour. The effluent solution contains substantially no heparin. The column is washed with approximately 10 liters of 0.5 M sodium chloride solution and the heparin is then eluted from the resin with 25% sodium chloride solution (about 5.1 molar). The heparin recovery is as follows:

| Fraction | Volume (ml.) | Assay (units/ml.) | Percent of Heparin Activity in Extract |
|---|---|---|---|
| 1 | 430 | 3,770 | 84.7 |
| 2 | 680 | 95 | 3.4 |
| 3 | 700 | 5 | 0.2 |
| | | | 88.3 |

The resin after the above described elution is carried through two successive runs in recovering heparin from a filtered tissue extract containing heparin. Recoveries of heparin are 93 percent and 87 percent respectively, indicating that the resin is adapted for reuse after elution without reduction in yield.

*Example 4*

A quantity of 100 mls. of Dowex 1–X1 resin is placed in a 32 millimeter diameter glass column and 3 liters of a heparin-containing extract prepared as described in Example 2 (ammonium chloride at 0.5 molar, pH=8–8.3) is passed downwardly through the column at a constant rate of 40 ml./hour. Thereafter, the column is washed at a rate of 700 ml./hour with 4 liters of 0.5 molar sodium chloride solution at a pH of 8.0.

The resin containing bound heparin is then subjected to elution with a sodium chloride solution at a progressively increasing salt concentration of 0.5 to 2.7 molar. Fractions of effluent were collected, precipitated with methanol, the precipitates weighed and analyzed for heparin content with the results as tabulated below:

| Fraction | Range of Salt Molarity | Weight of Precipitate (mg.) | Heparin Potency (u./mg.) | Total Activity (units) | Percent of Eluted Activity in Fraction |
|---|---|---|---|---|---|
| 1 | 0.51–1.25 | 94.6 | 1.0 | 95 | 0.2 |
| 2 | 1.25–1.62 | 149.1 | 20.8 | 3,100 | 6.3 |
| 3 | 1.62–1.74 | 134.0 | 120.0 | 16,050 | 32.7 |
| 4 | 1.74–2.02 | 186.5 | 138.0 | 25,500 | 51.8 |
| 5 | 2.02–2.28 | 41.9 | 89.0 | 3,730 | 7.6 |
| 6 | 2.28–2.6 | 33.0 | 20.2 | 665 | 1.4 |
| | | | | 49,140 | 100.0 |

The foregoing results reveal that substantially all the heparin eluted from the resin is in the fractions 2 to 6. Moreover, 84.5 percent of the activity is in fractions 3 and 4 which have a potency of 120 to 138 u./mg. The material eluted from the resin at salt molarities of less than about 1.25 and greater than about 2.3 contain less than 1.6 percent of the total heparin activity, thus establishing the desirability of step-wise or gradient elution in accordance with a preferred embodiment of the invention.

*Example 5*

A series of experiments is carried out to investigate the use of salts other than ammonium chloride in the aqueous heparin-containing medium contacted with quaternary ammonium anion exchange resin in accordance with the invention.

In each experiment, 250 ml. of an aqueous heparin solution (activity=28.2 u./ml.) at pH 7 and a salt concentration of 0.5 normal is stirred for two hours with 2 ml. of Dowex 1-X2 (as described in Example 3). Samples of the supernatant are then taken and assayed.

The results of the experiments are as follows:

| Salt: | Percent of heparin activity absorbed by resin |
|---|---|
| Sodium chloride | >95 |
| Sodium nitrate | >95 |
| Sodium phosphate | 88 |
| Sodium acetate | 71 |
| Ammonium sulfate | 62 |

The results reveale that sodium chloride and nitrate are equivalent to ammonium chloride in that essentially quantitative absorption of heparin on the resin occurs. With the other salts, substantial heparin absorption occurs.

The invention has been described with reference to the specific sulfated polysaccharide heparin. Other sulfated polysaccharides, for example chitin sulfate, xylan sulfate, chondroitin sulfate, hyaluronic acid sulfate and the like, are the full equivalents of heparin in the above-described process and can be efficiently purified in accordance with the process of this invention.

The subject matter which the inventor regards as his invention is particularly pointed out and distinctly claimed as follows:

I claim:

1. A method of recovering heparin which comprises treating a heparin-containing material in an aqueous medium at a pH between about 4 and about 10 with a cross-linked copolymer of a mixture of an aromatic monovinyl hydrocarbon and an aromatic divinyl hydrocarbon, said mixture containing 96 to 99.9 mole percent of said monovinyl hydrocarbon and 4 to 0.1 mole percent of said divinyl hydrocarbon, said copolymer bearing on the aromatic nuclei substituent groups of the formula

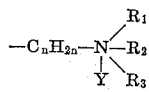

wherein $n$ is 1 to 4, $R_1$, $R_2$ and $R_3$ are hydrocarbon groups and Y is an anion, said copolymer containing at least one of said substituent groups for each 15 aromatic nuclei said aqueous medium comprising an effective amount of a member selected from the group consisting of the water soluble alkali metal, alkaline earth metal and ammonium salts of an acid and separating the copolymer containing bound heparin from the aqueous medium.

2. A method according to claim 1 wherein said cross-linked copolymer is a copolymer of a mixture of 98 to 99 mole percent styrene and 2 to 1 mole percent divinyl-benzene bearing on the aromatic nuclei at least 1 substituted group for each 15 aromatic nuclei having the formula:

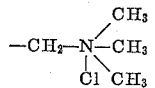

3. A method according to claim 1 wherein said cross-linked copolymer is a copolymer of a mixture of 98 to 99 mole percent styrene and 2 to 1 mole percent divinyl-benzene bearing on the aromatic nuclei at least 1 substituent group for each 15 aromatic nuclei having the formula:

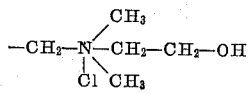

4. A method according to claim 1 wherein heparin is recovered from the separated copolymer containing bound heparin by elution with an aqueous solution of a member selected from the group consisting of ammonium nitrate, ammonium chloride, alkali metal nitrates and alkali metal chlorides.

5. A method according to claim 4 wherein said effective amount comprises between about 0.1 and 1.0 molar concentration when said water soluble salt of an acid is a nitrate and between about 0.1 and 1.25 molar concentration when said water soluble salt is a chloride, and wherein heparin is recovered from the separated copolymer by elution with an aqueous solution of a member selected from the group consisting of the water soluble alkali metal and ammonium salts of a mineral acid at a concentration of at least 1.9 molar.

6. A method of recovering heparin which comprises treating a heparin-containing material in an aqueous medium at a pH of about 4 to about 10 with a cross-linked copolymer of a mixture of an aromatic monovinyl hydrocarbon and an aromatic divinyl hydrocarbon, said mixture containing 96 to 99.9 mole percent of said monovinyl hydrocarbon and 4 to 0.1 mole percent of said divinyl hydrocarbon, said copolymer bearing on the aromatic nuclei substituent groups of the formula

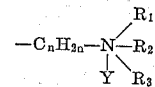

wherein $n$ is 1 to 4, $R_1$, $R_2$ and $R_3$ are hydrocarbon groups and Y is an anion, said copolymer containing at least one of said substituent groups for each 15 aromatic nuclei, said aqueous medium comprising an effective amount of a member selected from the group consisting of the water soluble alkali metal, alkaline earth metal and ammonium salts of an acid, separatiing the copolymer containing bound heparin from the aqueous medium, contacting the separated copolymer with a first aqueous solution of a member selected from the group consisting of alkali metal and ammonium nitrates at a concentration of about 1 to about 1.25 moles per liter and alkali metal and ammonium chlorides at a concentration of about 1.25 to about 1.6 moles per liter, separating the copolymer from said first aqueous solution, and contacting the so-separated copolymer with a second aqueous solution of a member selected from the group consisting of ammonium nitrate, ammonium chloride, alkali metal nitrates and alkali metal chlorides at a concentration of at least 1.9 molar.

7. A method according to claim 6 wherein the concentration of said member in said second aqueous solution is about 1.9 to about 2.3 molar.

8. A method according to claim 7 wherein the copolymer after contact with said second aqueous solution is separated therefrom and contacted with a third aqueous solution of a member selected from the group consisting of ammonium nitrate, ammonium chloride, alkali metal nitrates and alkali metal chlorides at a concentration of at least 3 molar thereby to yield a copolymer suitable for reuse in subsequent heparin recovery processes.

9. A method of recovering heparin which comprises treating a herapin-containing material in an aqueous medium at a pH of about 4 to about 10 with a cross-linked copolymer of a mixture of an aromatic monovinyl hydrocarbon and an aromatic divinyl hydrocarbon, said mixture containing 96 to 99.9 mole percent of said monovinyl hydrocarbon and 4 to 0.1 mole percent of said divinyl hydrocarbon, said copolymer bearing on the aromatic nuclei substituent groups of the formula

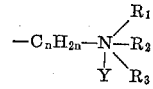

wherein $n$ is 1 to 4, $R_1$, $R_2$ and $R_3$ are hydrocarbon groups and Y is an anion, said copolymer containing at least one of said substituent groups for each 15 aromatic nuclei, said aqueous medium comprising an effective amount of a member selected from the group consisting of the water soluble alkali metal, alkaline earth metal and ammonium salts of an acid, separating the copolymer containing bound heparin from the aqueous medium, contacting the separated copolymer with a plurality of aqueous solutions of a member selected from the group consisting of ammonium nitrate, ammonium chloride, alkali metal nitrates and alkali metal chlorides having progressively increasing molarities to at least 1.9 molar, and precipitating heparin fractions of varying potencies from said solutions.

10. A method of isolating heparin from animal tissues which comprises extracting said tissues with an aqueous solution at a pH between about 4 and about 10 comprising about 0.1 to about 1.25 moles of ammonium chloride per liter, separating the extract from the tissue residue, treating said extract with a cross-linked copolymer of a mixture of 96 to 99.9 mole percent of styrene and 4 to 0.1 mole percent of divinylbenzene, said copolymer bearing on the benzene nuclei substituent groups of the formula

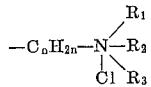

wherein $n$ is 1 to 4 and $R_1$, $R_2$ and $R_3$ are hydrocarbon groups, said copolymer containing at least one of said substituent groups for each 15 benzene nuclei, separating the copolymer containing bound heparin from the extract and contacting the separated copolymer with an aqueous solution of sodium chloride having a concentration of at least 1.9 molar.

11. A method of isolating heparin from animal tissues which comprises extracting said tissues with an aqueous solution at a pH between about 4 and about 10 comprising about 0.1 to about 1.25 moles of sodium chloride per liter, separating the extract from the tissue residue, treating said extract with a cross-linked copolymer of a mixture of 96 to 99.9 mole percent of styrene and 4 to 0.1 mole percent of divinylbenzene, said copolymer bearing on the benzene nuclei substituent groups of the formula

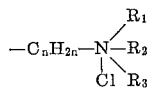

wherein $n$ is 1 to 4 and $R_1$, $R_2$ and $R_3$ are hydrocarbon groups, said copolymer containing at least one of said substituent groups for each 15 benzene nuclei, separating the copolymer containing bound heparin from the extract and contacting the separated copolymer with an aqueous solution of sodium chloride having a concentration of at least 1.9 molar.

References Cited

Schiller: The J. of Biological Chem., volume 236, No. 4, April 1961, pages 983 to 987.

ALBERT T. MEYERS, *Primary Examiner.*

S. ROSEN, *Assistant Examiner.*

Disclaimer and Dedication

3,337,409.—*Robert E. Williams*, Sherman Oak, Calif. PROCESS FOR THE RECOVERY OF HEPARIN. Patent dated Aug. 22, 1967. Disclaimer and dedication filed Nov. 8, 1974, by the assignee, Riker Laboratories, Inc.

Hereby disclaims and dedicates to the Public the remaining term of said patent.

[*Official Gazette April 29, 1975.*]